US007971785B2

(12) United States Patent
Naccache

(10) Patent No.: US 7,971,785 B2
(45) Date of Patent: Jul. 5, 2011

(54) METHOD FOR AUTHENTICATING MICRO-PROCESSOR CARDS, CORRESPONDING MICRO-PROCESSOR CARD, CARD READER TERMINAL AND PROGRAMS

(75) Inventor: David Naccache, Paris (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 0 days.

(21) Appl. No.: 12/369,328

(22) Filed: Feb. 11, 2009

(65) Prior Publication Data

US 2009/0200372 A1    Aug. 13, 2009

(30) Foreign Application Priority Data

Feb. 12, 2008   (FR) .................................... 08 50888

(51) Int. Cl.
*G06F 17/00* (2006.01)
*G06K 5/00* (2006.01)
*G06Q 10/00* (2006.01)
*H04K 1/00* (2006.01)
*G06F 21/00* (2006.01)

(52) U.S. Cl. ........... 235/380; 235/375; 705/1.1; 380/26; 380/27; 380/28; 713/185

(58) Field of Classification Search .................. 235/380; 380/24–26; 713/185
See application file for complete search history.

(56) References Cited

U.S. PATENT DOCUMENTS

| 5,436,971 A | 7/1995 | Armbrust et al. |
| 6,240,517 B1 * | 5/2001 | Nishioka ........................ 726/20 |

FOREIGN PATENT DOCUMENTS

| EP | 0427601 A1 | 5/1991 |
| WO | 0186601 A1 | 11/2001 |
| WO | 2005048603 A1 | 5/2005 |

OTHER PUBLICATIONS

Search Report dated Oct. 22, 2008, from French Application No. 0850888, filed on Feb. 12, 2008.

* cited by examiner

*Primary Examiner* — Michael G Lee
*Assistant Examiner* — Laura Gudorf
(74) *Attorney, Agent, or Firm* — David D. Brush; Westman, Champlin & Kelly P.A.

(57) ABSTRACT

A method is provided for authenticating micro-processor cards to determine whether a card is a genuine card or a fake card. Authentication is performed by a checking program of at least one card reader terminal. The program sends to each card commands belonging to a standard and public set of commands. The method includes: modifying the checking program in the terminal or terminals, in such a way that the program additionally sends, to each card to be authenticated, at least one additional command, called a secret command, from a set of at least one additional command, pre-inserted into each genuine card, and different from the standard and public set of commands; and a step of detecting authenticity of the card, if the secret command is recognised and/or processed correctly, or the presence of a clone, if the secret command is not recognised and/or is processed wrongly.

9 Claims, 3 Drawing Sheets

METHOD FOR AUTHENTICATING MICRO-PROCESSOR CARDS, CORRESPONDING MICRO-PROCESSOR CARD, CARD READER TERMINAL AND PROGRAMS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the fight against the counterfeiting of objects with a secure micro-processor, hereinafter referred to as an electronic chip.

The disclosure relates more particularly to the detection of fraud, attempts at fraud or any other illegal actions using copied, counterfeit, imitated or cloned chip objects, by ill-intentioned persons.

The disclosure applies in particular to chip cards.

BACKGROUND OF THE DISCLOSURE

A description is given hereinafter, by way of example, of the use of these chip cards as payment cards which are, in a known way, used for example to pay for purchases at a retailer's or to withdraw banknotes from an automatic cash dispenser (ATM).

Other applications, such as accessing a web site or a service, are of course also known and processed in the same way. Likewise, it is understood that the "chip card" concept can be generally applied to other types of portable objects fitted with a secure micro-processor.

The specifications of chip cards operating with an electrical contact are laid down under international standard ISO 7816 from the "International Organisation for Standardisation". These specifications are public and accessible to all, and therefore among others to ill-intentioned persons.

In particular, the standard ISO 7816-4 specifies the content of messages (commands, responses) between a chip card and a card reader and the structures of the data contained in these messages (making communications secure). The basic commands for reading, writing and updating the data on a chip card by a card reader, and which will be called hereinafter "standard and public commands", are for example:

- a security command (verify a personal identification number, known as a PIN, for example);
- a personalisation command (write into the memory);
- a payment command (debit, credit);
- a cryptography command (sign a data block, verify the signature, generate a key);
- a file management command (select, read, write, create).

The EMV (Europay, Mastercard and Visa (trademarks)) international security standard, which is specific to the banking sector, lays down the rules necessary for international interoperability between payment cards and card reader terminals, enabling transactions to be made in a secure way, whatever payment card issuer and whatever card reader terminal is involved.

A counterfeiter (fraudster) having extracted from a lawful or genuine card (in other words a card issued by authorised chip card manufacturers) the information allowing him to reproduce its logic behaviour, can, from the aforementioned public specifications, program a commercially available electronic circuit to produce a cloned or fake card (hereinafter referred to as a "clone").

Attempts have previously been made to prevent the cloning of genuine payment cards through the use of cryptographic keys, by assigning to a payment card a personal identification number (PIN), a confidential code or secret code, which is supposed to be known only to the bearer (authorised user) of the payment card.

1. Drawbacks of the Prior Art

A technique of this kind does not however afford full guarantees against the cloning of payment cards, since a confidential code associated with a payment card may be disclosed either at the card embedder's (card manufacturer's) when the card is personalised, or at the card issuer's (service provider such as a telephone operator or a banking institution for example) out of malicious intent or as a result of an attack by a fraudster.

A cloned payment card, if it has been efficiently programmed, is hard to tell apart from a genuine payment card, since their logic behaviours are identical, even if they do not comprise the same electronic circuit, and there has hitherto been no effective detection method in existence capable of detecting cloned payment cards.

SUMMARY

An aspect of the present disclosure relates to a method for authenticating micro-processor cards to determine whether a card is a genuine card, supplied by an authorised distributor, or a fake card, known as a clone, supplied by an unauthorised third party, by a checking program of at least one card reader terminal, said program sending to each card commands belonging to a standard and public set of commands.

According to an aspect of the disclosure, said method comprises the following steps:

- a preliminary step of modifying said checking program in said terminal or terminals, in such a way that said program additionally sends, to each card to be authenticated, at least one additional command, so-called secret command, from a set of at least one additional command, pre-inserted into each genuine card, and different from said standard and public set of commands;
- a step of detecting the authenticity of said card, if said secret command is recognised and/or processed correctly, or the presence of a clone, if said secret command is not recognised and/or is processed wrongly.

The inventive method thus enables a verification of the authenticity of a chip card based on the recognition and/or processing by the chip card of a command that is secret (and therefore different from standardised or public ones) and transmitted by a card reader terminal. Since the secret command is pre-inserted into each genuine chip card, only a genuine chip card can correctly recognise and/or process said secret command when it is transmitted by a card reader terminal. The presence of a clone is therefore detected when a chip card cannot correctly recognise and/or process said secret command (even if this clone reacts correctly to public commands).

Such a method is relatively inexpensive, reliable and straightforward to implement. All that is needed, at a given time when so required (for example a sudden upsurge in clones), is to adapt the software in the terminals so it can issue one or more secret commands.

According to one preferred implementation, the inventive method comprises a step of generating an alarm and/or invalidating or blocking the clone when the presence of a clone is detected.

The inventive method thus prevents a clone from being used once it has been detected.

According to one particular embodiment, implementing said secret commands involves performing at least one of the operations belonging to the group that comprises:
   reading and/or writing in a memory;
   mathematical and logic operations.

According to another particular embodiment, said step of detecting comprises the following sub-steps:
   implementing at least two secret commands, so as to obtain at least two pieces of information;
   comparing or combining said pieces of information, in order to deliver an output of the step of detecting.

The inventive method can thus implement more or less complex secret commands, consisting of straightforward memory accesses or of a succession, or combination, of more complex operations (for example, operations that input the outcome of a previously performed operation).

By implementing complex secret commands it is possible to ensure that a clone that has response capabilities to any invocation, even one not recognised as a standard and public command, will not after all be able to respond correctly to a secret command comprising a plurality of mathematical or logic operations.

According to another feature, an aspect of the disclosure relates to a micro-processor card for implementing the method for detecting fake micro-processor cards, known as clones. Such a card comprises a command storage memory for storing commands, comprising:
   a first standard and public set of commands; and
   a second set of at least one additional command, so called secret command.

The microprocessor card is configured to be accessed by at least one card reader terminal and to receive from the at least one card reader terminal commands belonging to the first standard and public set of commands and at least secret command, from the second set of at least one additional secret command, pre-inserted into the card and different from said first standard and public set of commands.

Thus, not only standard and public commands but also one or more secret commands are stored in a card, preferably at the time the card is manufactured.

According to one preferential embodiment, at least said second set is stored in a secure part of said memory.

An implementation of this kind means that a genuine card can be given greater security against any attempt at cloning.

According to another feature, an aspect of the disclosure relates to a micro-processor card reader terminal, for implementing the method for detecting fake micro-processor cards, known as clones, and whether a card is a genuine card, supplied by an authorised distributor, by a checking program implementing a standard and public set of commands. Such a terminal comprises:
   means for receiving and running a modified checking program, comprising the implementation of at least one additional command, called a secret command, from a set of at least one secret command, pre-inserted into each genuine card, and different from said standard and public set of commands;
   means for detecting the authenticity of said card, if said secret command is recognised and/or processed correctly by the chip card, or the presence of a clone, if said secret command is not recognised and/or is processed wrongly.

Yet another inventive feature relates to a computer program product that can be downloaded from a communications network and/or stored on a medium that can be read by computer and/or run by a micro-processor, enabling the relevant program to be implemented in a card reader terminal.

For example, an inventive feature relates to a computer program product stored on a medium that can be read by computer and/or run by a micro-processor. The product comprises program code instructions for implementing a method for authenticating micro-processor cards to determine whether a card is a genuine card, supplied by an authorised distributor, or a fake card, known as a clone, supplied by an unauthorised third party, when said program code instructions operate on a computer. In one embodiment, the method includes:
   sending to each card from at least one card reader terminal commands belonging to a standard and public set of commands,
   a preliminary step of modifying said program code instructions in said terminal or terminals, in such a way that said instructions additionally send, to each card to be authenticated, at least one additional command, called a secret command, from a set of at least one additional command, pre-inserted into each genuine card, and different from said standard and public set of commands;
   a step of detecting the authenticity of said card, if said secret command is recognised and/or processed correctly, or the presence of a clone, if said secret command is not recognised and/or is processed wrongly.

In another example, an inventive feature relates to a computer program product stored on a medium that can be read by computer and/or run by a micro-processor. The product comprises means for implementing at least one secret command from a set of at least one secret command, different from a standard and public set of commands, and wherein implementing said secret command involves performing at least one of the operations belonging to the group that comprises:
   reading and/or writing in a memory;
   mathematical and logic operation,
when said program product operates on a computer.

BRIEF DESCRIPTION OF THE DRAWINGS

Other characteristics and advantages will emerge more clearly from reading the following description of two particular embodiments, given as straightforward illustrative and non-restrictive examples, and the appended drawings, among which.

DETAILED DESCRIPTION OF ILLUSTRATIVE EMBODIMENTS

1. General Principle

Figure 1:
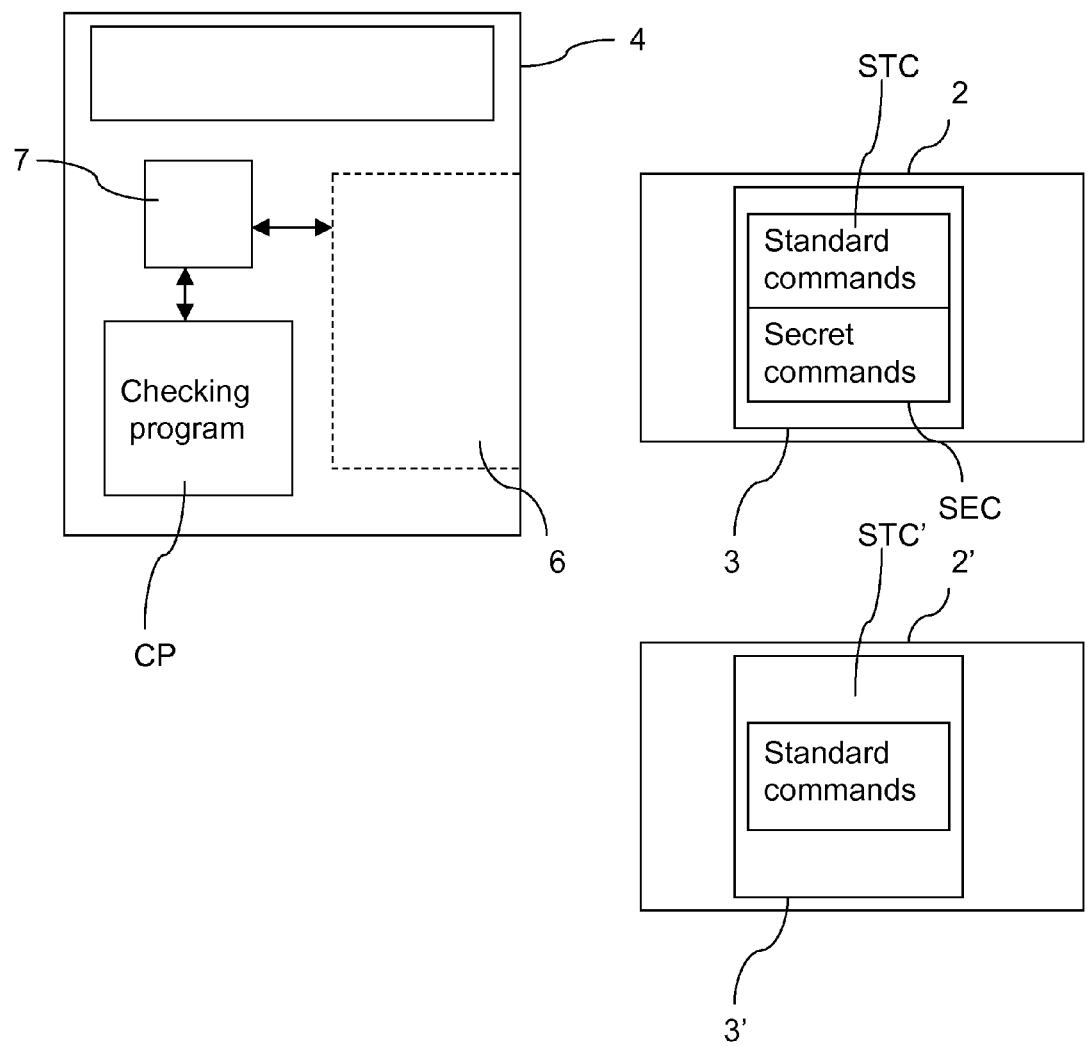
FIG. 1 shows diagrammatically an example of a system implementing an aspect of the disclosure according to one particular inventive embodiment.

The general inventive principle of an aspect of the disclosure is based on the storage, in addition to a standard and public set of commands, of a set of at least one secret command, which cannot be known to a counterfeiter, in a micro-processor card memory. To be more precise, an example of the method enables card authenticity to be detected based on the recognition and/or the processing by this card of a secret command invoked (issued) by a card reader terminal.

2. Example of System Implementing an Aspect of the Disclosure

Consideration is given hereinafter to one particular inventive embodiment, in relation to FIG. 1, according to which a chip card 2 (micro-processor card) is a payment card issued by a banking institution. The chip card 2 is genuine, i.e. not cloned, and is capable of communicating with a payment terminal 4 (chip card reader terminal) when it is inserted into a card reader 6 in the payment terminal 4.

It is assumed here that the bearer of the chip card 2 wishes to access a banking service requiring him to pre-authenticate himself through the payment terminal 4.

The chip card 2 conventionally comprises a micro-processor and different RAM, ROM and/or EEPROM memories (not shown).

The payment terminal 4 generally comprises a display screen, a digital or alphanumeric keyboard, a printer (not shown), a card reader 6 and a central processing unit (micro-processor) 7.

The payment terminal 4 also comprises a checking program CP which can be implemented by the micro-processor 7.

An aspect of the disclosure therefore proposes inserting into a genuine card (such as the chip card 2), in addition to a first standard and public set of commands STC, a second set of at least one secret command SEC, the first set of commands STC being different from the second set of commands SEC. The first and second sets of commands STC and SEC can be stored in a command storage memory 3 in the chip card 2 during the manufacture thereof, for example at the card embedder's. The second set of commands SEC, at least, can be stored in a secure part of the memory 3.

In FIG. 1 has been shown a cloned chip card 2' comprising a standard and public set of commands STC' (obtained for example on the Internet) but which obviously does not include any secret commands unlike the genuine chip card 2.

Should it turn out that cloned cards (of the same type as the chip card 2') are in circulation, an aspect of the disclosure then proposes detecting these clones by modifying the checking program CP of the payment terminals (or at least some of them), such as the payment terminal 4, so that they use the secret commands.

According to an aspect of the disclosure, the payment terminal 4 comprises means for receiving a modified checking program and means for running the modified checking program. This modified checking program may comprise the invoking (or implementing) of at least one secret command from the set of at least one secret command SEC which has been pre-inserted into each genuine card, as stressed previously.

The secret command invocation involves performing at least one of the operations belonging to the group that comprises:

reading and/or writing in a memory;
mathematical or logic operations.

For example, the secret command invocation may consist of one or more accesses, in read or write mode, to a card memory. A command invocation may thus in a first phase require a pre-determined data item to be written in the memory, and then, in a second phase, may require said previously written data item to be read.

In a more complex way, a secret command invocation may consist of a succession of mathematical or logic operations. For example, said secret command may recover two data items from two different memory locations, add them together or multiply them, and compare the outcome against an expected outcome.

These secret commands do not in principle modify the "practical" operation of the terminal (for example conventional cash dispensing operations), but enable checking processes to be added, which will enable genuine cards to be differentiated from clones.

The payment terminal 4 thus comprises means for detecting the authenticity of a chip card inserted into the card reader 6 if the secret command is recognised and/or processed correctly by the chip card, or the presence of a clone, if the secret command is not recognised and/or is processed wrongly by the card.

3. First Implementation Example

The main steps in a method for detecting fake microprocessor cards according to a first particular inventive embodiment, is set out below, in relation to FIG. 2.

Consideration is given hereinafter to a configuration wherein a chip card (whether it is genuine 2 or cloned 2') is inserted into the card reader 6 in the payment terminal 4 and wherein the checking program CP of the payment terminal 4 has been modified in response for example to information to the effect that cloned cards are in circulation.

Figure 2:
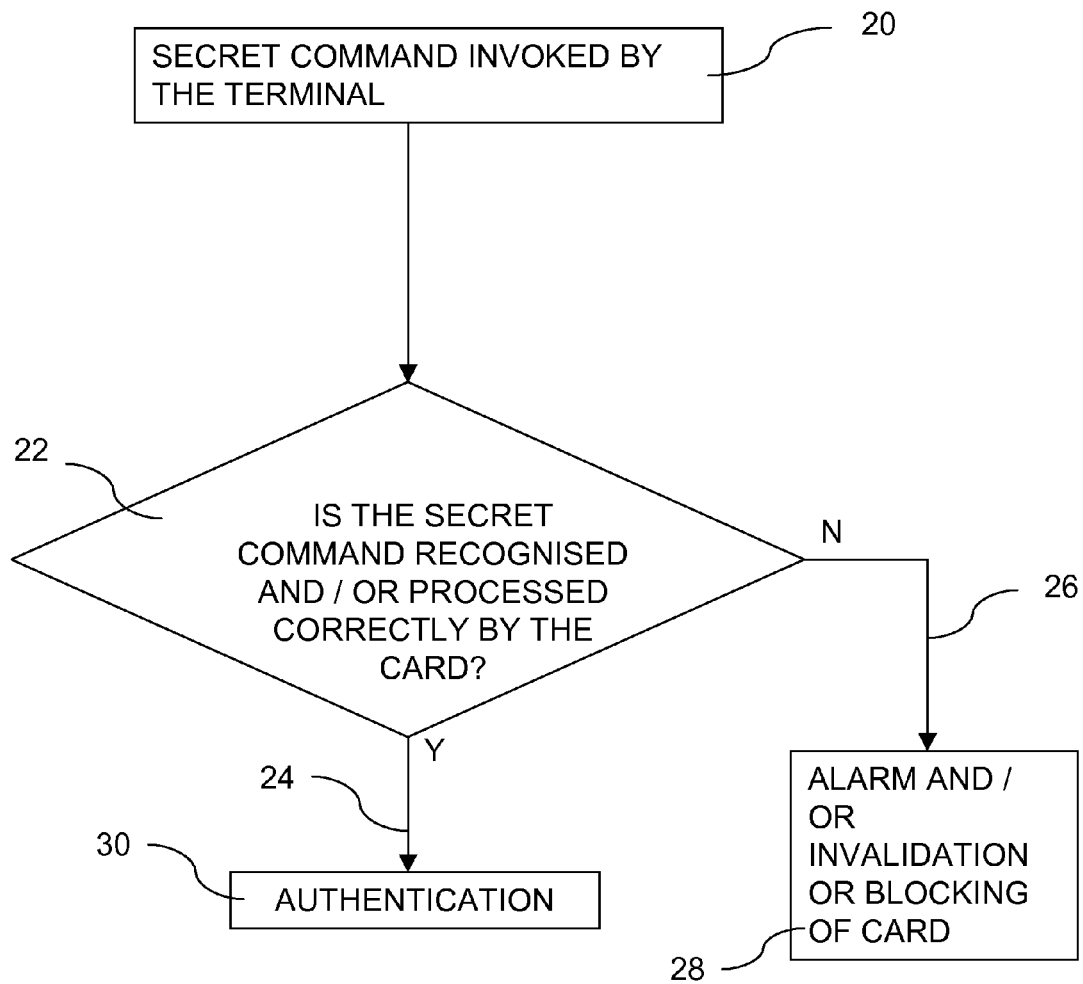
FIG. 2 shows the main steps in the method for detecting fake micro-processor cards according to a first embodiment.

As shown in FIG. 2, the inventive detection method starts with a step 20 of invoking at least one so-called secret command in the modified checking program CP of the payment terminal 4.

A determination is then made at step 22 as to whether the secret command is recognised and/or processed correctly by the chip card.

The "yes" output 24 enables for example moving to a conventional authentication step 30 which consists in comparing a signature entered on the keypad of the payment terminal 4 with the data present in the chip card 2. This processing operation, known per se and applied in all chip cards, is not described in greater detail here.

The "no" output 26 indicates that the presence of a clone has been detected which may lead at step 28 to the generation of an alarm and/or the invalidation or blocking of the clone by the payment terminal 4.

4. Second Embodiment Example

The main steps in a method for detecting fake microprocessor cards according to a second particular inventive embodiment are set out below, in relation to FIG. 3.

Consideration is given hereinafter to a configuration wherein a chip card (whether it is genuine 2 or cloned 2') is inserted into the card reader 6 of the payment terminal 4 and wherein the checking program CP of the payment terminal 4 has been modified in response for example to information to the effect that cloned cards are in circulation.

Figure 3:
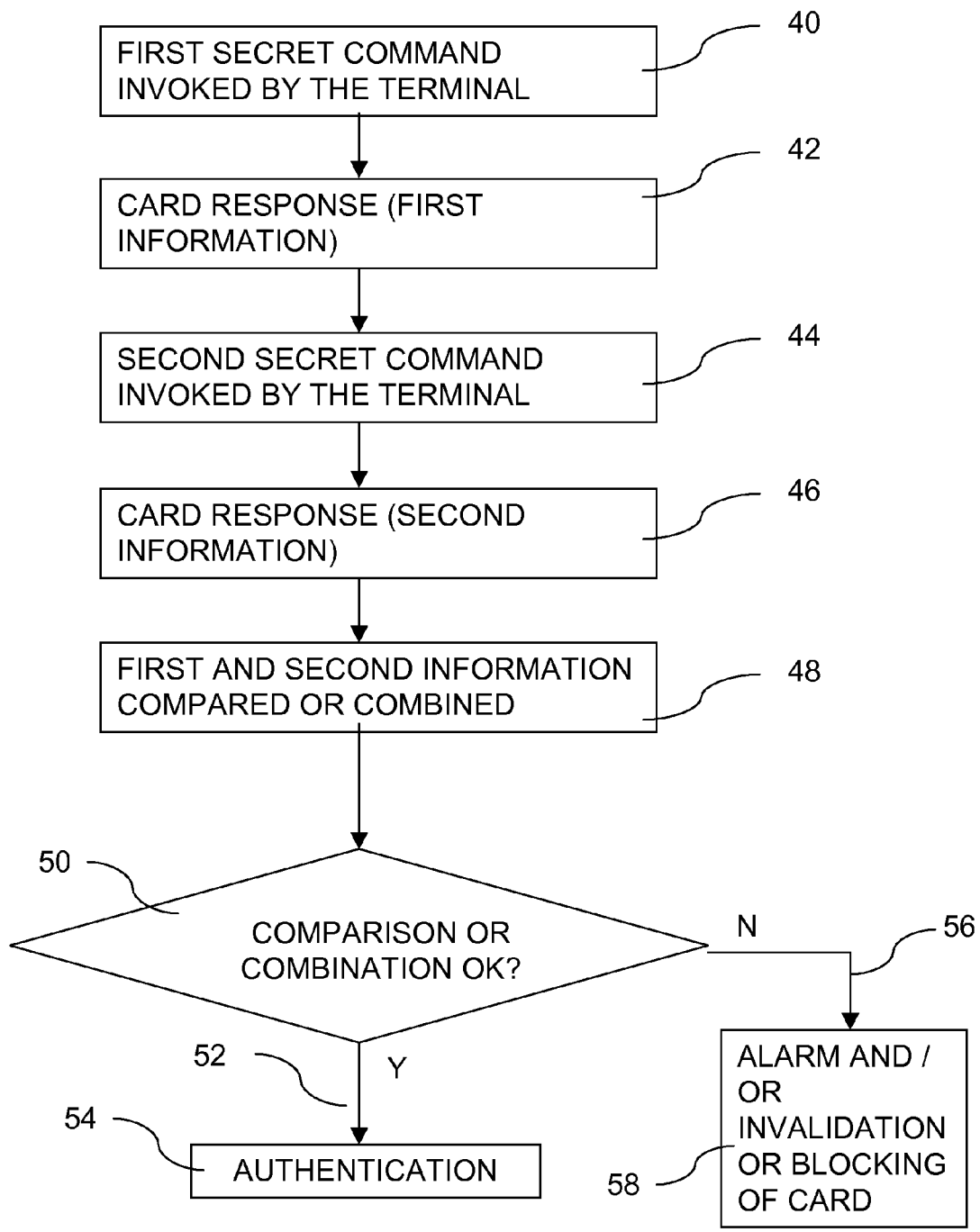
FIG. 3 shows the main steps in the method for detecting fake micro-processor cards according to a second embodiment.

As shown in FIG. 3, the inventive detection method starts with a step 40 of invoking at least one so-called secret command in the modified checking program CP of the payment terminal 4.

This first secret command is processed by the chip card and the processing outcome (first information) is then transmitted (notified) to the payment terminal 4, at step 42.

There follows a step 44 of invoking at least one second so-called secret command in the modified checking program CP of the payment terminal 4.

This second secret command is processed by the chip card and the processing outcome (second information) is then transmitted to the payment terminal 4, at step 46.

The first and second pieces of information are then compared or combined in the payment terminal 4, at step 48, in order to deliver a chip card authenticity detection outcome.

For example, invoking the first and second secret commands enables firstly a first and a second piece of information respectively to be recovered from two different memory locations of the card, and then enables them to be added together or multiplied, and enables the outcome to be compared against an expected outcome in order to deliver a detection outcome (52 or 56).

In the same way as in the first embodiment in relation to FIG. 2, the "yes" output 52 makes it possible for example to move on to a conventional authentication step 54 which consists in comparing a signature entered on the keypad of the payment terminal 4 with the data present in the chip card 2. The "no" output 56 indicates the detection of the presence of a clone which may lead at step 58 to the generation of an alarm and/or the invalidation or blocking of the clone by the payment terminal 4.

The simultaneous or sequential sending of two secret commands in this second embodiment thereby allows a cloned chip card to be detected even more reliably.

The inventive method is relatively inexpensive, reliable and straightforward to implement. It can be used to fight against the counterfeiting of chip cards, or of a similar portable object, to detect fake cards (clones) and to prevent them from being used.

5. Alternatives

Aspects of the present disclosure may also apply to any situation that requires access to be restricted to a place or a location, to a vehicle belonging to one or more persons, to an Internet site or a database, for example.

The card reader terminal and the chip card can be connected by contacts or remotely (RFID for example).

One aspect of the present disclosure therefore provides an effective technique for fighting against the counterfeiting of chip cards, or of a similar portable object.

An aspect of the disclosure allows detection of fake cards, known as clones, and prevention of them being used.

A further aspect provides a technique of this kind that is relatively inexpensive, reliable and straightforward to implement.

Although the present disclosure has been described with reference to one or more examples, workers skilled in the art will recognize that changes may be made in form and detail without departing from the scope of the disclosure and/or the appended claims.

What is claimed is:

1. A method for authenticating micro-processor cards to determine whether a card is a genuine card, supplied by an authorised distributor, or a fake card, known as a clone, supplied by an unauthorised third party, by a checking program of at least one card reader terminal, said program sending to each card commands belonging to a standard and public set of commands, wherein the method comprises:
a preliminary step of modifying said checking program in said terminal or terminals, in such a way that said program additionally sends, to each card to be authenticated, at least one additional command, called a secret command, from a set of at least one additional command, pre-inserted into each genuine card, and different from said standard and public set of commands;
a step of detecting the authenticity of said card, if said secret command is recognised and/or processed correctly, or the presence of a clone, if said secret command is not recognised and/or is processed wrongly.

2. The method according to claim 1, wherein the detection of the presence of a clone leads to generation of an alarm and/or invalidation or blocking of said clone.

3. The method according to claim 1, wherein implementing said secret commands involves performing at least one of the operations belonging to the group that comprises:
reading and/or writing in a memory;
mathematical and logic operations.

4. The method according to claim 1, wherein said step of detecting comprises the following sub-steps:
implementing at least two secret commands, so as to obtain at least two pieces of information;
comparing or combining said pieces of information, in order to deliver an outcome of the step of detecting.

5. A micro-processor card for implementing the method for detecting fake micro-processor cards, known as clones, wherein the microprocessor card comprises:
a command storage memory, comprising:
a first standard and public set of commands; and
a second set of at least one additional, secret command,
the microprocessor card being configured to be accessed by at least one card reader terminal and to receive from the at least one card reader terminal commands belonging to the first standard and public set of commands and at least secret command, from the second set of at least one additional secret command, pre-inserted into the card and different from said first standard and public set of commands.

6. The micro-processor card according to claim 5, wherein at least said second set is stored in a secure part of said command storage memory.

7. A micro-processor card reader terminal, for implementing a method for detecting fake micro-processor cards, known as clones, and whether a card is a genuine card, supplied by an authorised distributor, by a checking program implementing a standard and public set of commands, wherein the terminal comprises:
means for receiving and running a modified checking program, comprising implementation of at least one additional command, called a secret command, from a set of at least one secret command, pre-inserted into each genuine card, and different from said standard and public set of commands;
means for detecting the authenticity of said card, if said secret command is recognised and/or processed correctly by the card, or the presence of a clone, if said secret command is not recognised and/or is processed wrongly.

8. Computer program product stored on a non-transitory medium that can be read by computer and/or run by a microprocessor, wherein the product comprises program code instructions for implementing a method for authenticating micro-processor cards to determine whether a card is a genuine card, supplied by an authorised distributor, or a fake card, known as a clone, supplied by an unauthorised third party, when said program code instructions operate on a computer, wherein the method comprises:

sending to each card from at least one card reader terminal commands belonging to a standard and public set of commands, a preliminary step of modifying said program code instructions in said terminal or terminals, in such a way that said instructions additionally send, to each card to be authenticated, at least one additional command, called a secret command, from a set of at least one additional command, pre-inserted into each genuine card, and different from said standard and public set of commands;

a step of detecting the authenticity of said card, if said secret command is recognised and/or processed correctly, or the presence of a clone, if said secret command is not recognised and/or is processed wrongly.

9. A computer program product stored on a non-transitory medium that can be read by computer and/or run by a microprocessor, wherein the product comprises instructions that perform a method when the program product operates on a genuine micro-processor card, the method comprising:

receiving from a card reader terminal at least one card command belonging to a standard and public set of commands, and receiving from the card reader terminal at least one secret command from a set of at least one secret commands, different from the standard and public set of commands, and implementing the at least one secret command by recognizing and/or processing the at least one secret command to prove authenticity of said genuine card, and wherein implementing said at least one secret command involves performing at least one of the operations belonging to the group that comprises: reading and/or writing in a memory; mathematical and logic operation.

* * * * *